(12) United States Patent
Chu

(10) Patent No.: US 9,275,483 B2
(45) Date of Patent: Mar. 1, 2016

(54) METHOD AND SYSTEM FOR ANALYZING SEQUENTIAL DATA BASED ON SPARSITY AND SEQUENTIAL ADJACENCY

(75) Inventor: Maurice K. Chu, Burlingame, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 202 days.

(21) Appl. No.: 13/607,205

(22) Filed: Sep. 7, 2012

(65) Prior Publication Data

US 2014/0071133 A1    Mar. 13, 2014

(51) Int. Cl.
*G06T 11/20*    (2006.01)

(52) U.S. Cl.
CPC .................................... *G06T 11/206* (2013.01)

(58) Field of Classification Search
None
See application file for complete search history.

(56) References Cited

U.S. PATENT DOCUMENTS

| | | | |
|---|---|---|---|
| 7,777,743 B2 | 8/2010 | Pao | |
| 2004/0196286 A1* | 10/2004 | Guzik | 345/440 |
| 2007/0239753 A1 | 10/2007 | Leonard | |
| 2012/0113124 A1* | 5/2012 | Lecerf et al. | 345/442 |
| 2013/0144916 A1* | 6/2013 | Lum et al. | 707/790 |

OTHER PUBLICATIONS

Das et al., "Principal Component Analysis of Temporal and Spatial Information for Human Gait Recognition", Proceedings of the 26th Annual International Conference of the IEEE EMBS, Sep. 2004, pp. 4568-4571.*
Vlahogianni, Eleni I., Matthew G. Karlaftis, and John C. Golias. "Statistical methods for detecting nonlinearity and non-stationarity in univariate short-term time-series of traffic volume." Transportation Research Part C: Emerging Technologies 14.5 (2006): 351-367.*
"Mining Similarity using Euclidean Distance, Pearson Correlation, and Filtering", http://mines.humanoriented.com/classes/fall/csci568/portfolio_exports/lguo/similarity.html, 2010.
Zhang, Youwei et al., "Sparse PCA: Convex Relaxations, Algorithms and Applications", 2010, http://www.eecs.berkeley.edu/~elghaoui/pubs/spcahandbooksv.pdf.

* cited by examiner

*Primary Examiner* — Phi Hoang
*Assistant Examiner* — Diane Wills
(74) *Attorney, Agent, or Firm* — Shun Yao; Park, Vaughan, Fleming & Dowler LLP

(57) ABSTRACT

One embodiment of the present invention provides a system for generating a classifier to detect patterns in a data sequence. During operation, the system receives the data sequence, which represents a sequence of measurements of a phenomenon. The system transforms the data sequence into a feature sequence that is of a higher dimensionality than a dimensionality of the data sequence, and the feature sequence is a sequence of feature vectors each created from contiguous members of the data sequence. Next, the system generates a graph where each node of the graph corresponds to a feature vector. The system converts the generated graph into a two-dimensional graph. Subsequently, the system displays, to a user, the two-dimensional graph. The system receives user input indicating that a region of the two-dimensional graph corresponds to a pattern associated with the feature sequence, and then generates a classifier based on the received user input.

22 Claims, 9 Drawing Sheets

METHOD AND SYSTEM FOR ANALYZING SEQUENTIAL DATA BASED ON SPARSITY AND SEQUENTIAL ADJACENCY

BACKGROUND

1. Field

This disclosure is generally related to machine learning. More specifically, this disclosure is related to a method and system for enabling non-experts to create classifiers for patterns in a data sequence.

2. Related Art

Machine learning systems allow users to interpret sequential data, such as global positioning signals (GPS), vision, or speech data. With GPS, as a person or vehicle moves, a stream of high-dimensional temporal data is created by the GPS device. The GPS information may include a time-stamped stream of latitude and longitude values, elevation, satellite information, measurement errors, velocity, and other information. Interpreting such data to determine movement patterns, such as left turns and right turns, is a non-trivial task. This problem is complicated by the fact that humans have difficulty comprehending high-dimensional data. High-dimensional data is data with multiple dimensional values. For example, a point on a map that includes latitude and longitude data has two dimensions, and a point on a map with elevation, time, latitude, and longitude data is a four-dimensional value. Even experts in machine learning consider it difficult to visualize and work with such high-dimensional data sequences that include more than two or three dimensions.

In one approach, one can classify the multi-dimensional data by viewing the data through hierarchical visualization. Hierarchical visualization involves processing each dimension one-by-one. This process requires the user to recursively process successive visualization regions at great levels of detail. In another approach, one can analyze time-series transactional data by using a distance matrix generated from a similarity matrix to reduce the time-series data.

Unfortunately, such approaches are not sufficiently effective for non-experts to analyze and classify patterns in sequential data.

SUMMARY

One embodiment of the present invention provides a system for generating a classifier to detect patterns in a data sequence. During operation, the system receives the data sequence, in which the data sequence represents a sequence of measurements of a phenomenon. The system transforms the data sequence into a feature sequence that is of a higher dimensionality than a dimensionality of the data sequence, and in which the feature sequence is a sequence of feature vectors each created from contiguous members of the data sequence. Next, the system generates a graph, in which each node of the graph corresponds to a feature vector. The system converts the generated graph into a two-dimensional graph. The system displays, to a user, the two-dimensional graph. Subsequently, the system receives user input indicating that a region of the two-dimensional graph corresponds to a pattern associated with the feature sequence, and generates a classifier based on the received user input.

In a variation on this embodiment, the system determines that a distance between one or more feature vectors is within a threshold distance, and clusters the one or more feature vectors together to create a feature cluster.

In a variation on this embodiment, the system receives user input to select a point from the two-dimensional graph, and displays a graphical depiction of a vector pattern corresponding to the selected point.

In a variation on this embodiment, the system receives user input to select a sequence of regions in the two-dimensional graph, and associates the sequence of regions with a particular pattern, in which generating the classifier further includes generating the classifier based on the association between the sequence of regions and the particular pattern.

In a variation on this embodiment, displaying the two-dimensional graph further includes receiving user input to select a particular point for playback, and displaying an animation illustrating edges connected to points alongside illustrations of patterns corresponding to the connected points.

In a variation on this embodiment, each feature vector is created from contiguous members of the data sequence within a time window of a predetermined length sliding across the data sequence.

In a variation on this embodiment, converting the generated graph further includes relaxing the two-dimensional graph by contracting edges greater than a predetermined length and expanding edges shorter than the predetermined length.

BRIEF DESCRIPTION OF THE FIGURES

In the figures, like reference numerals refer to the same figure elements.

DETAILED DESCRIPTION

Figure 1A:
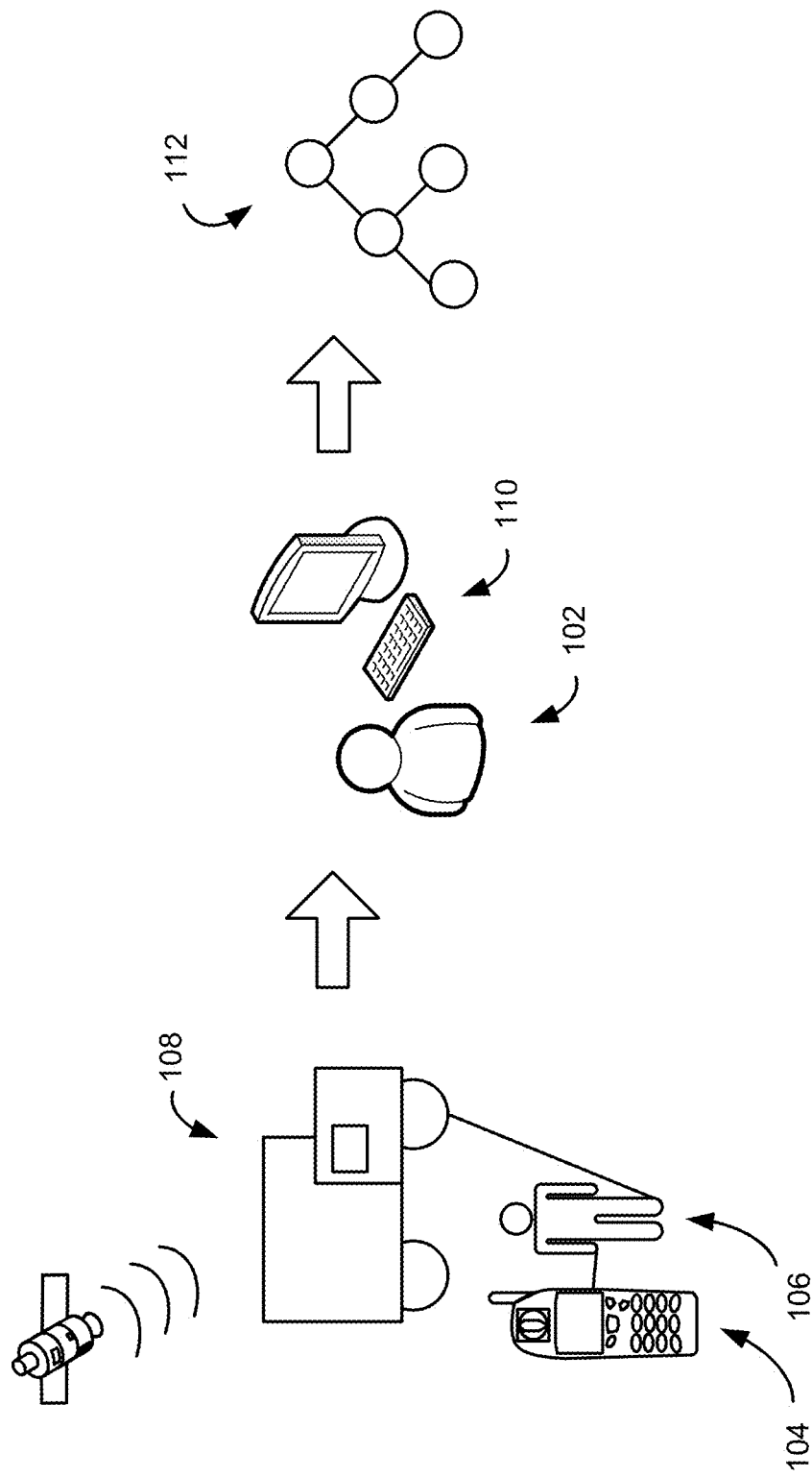
FIG. 1A presents a diagram illustrating a computing environment within which a user creates a classification scheme for detecting patterns in a data sequence, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of enabling non-experts to classify patterns in a high-dimensional data sequence by generating classifiers based on user input associating the patterns with graphical displays of the data sequence.

In one embodiment, the system receives an input data sequence that represents measurements of some phenomenon (e.g., GPS coordinates), and processes the data to display a two-dimensional image to a user. The user views the image and provides information to the system to facilitate the generation of a classifier. Based on viewing the two-dimensional image alongside graphical depictions of patterns in the data sequence, the user can determine which points in the two-dimensional image correspond to interesting patterns in the data sequence. The system then generates classifiers for the patterns in accordance with the user input.

During operation, the system pre-processes the input data sequence in a manner that enforces graph sparsity and measures affinity by sequential adjacency. The system initially transforms the input data sequence (e.g. GPS latitude and longitude coordinates) into a higher dimensional feature sequence. To perform the transformation, the system slides a time window across the sequence, and aggregates the contiguous data points in the time window into a single feature vector, thereby inducing graph sparsity. The graph sparsity allows the system to spread feature points, making it easier for non-experts to identify two-dimensional regions corresponding to patterns. Next, the system projects the graph to two dimensions using principal component analysis (PCA). Subsequently, the system performs a simulation by treating the edges as springs to relax the graph.

The system can then present animations to the user highlighting various edges and points of the two-dimensional graph corresponding to illustrated patterns. Users can draw boundaries and label parts of the graph that correspond to interesting patterns (e.g., left turns, slow driving, right turns). This way, the system enables non-expert users to generate classifiers for sequential data.

Note that embodiments of the invention perform well with data sequences that are high-dimensional because the conversion and visualization of high-dimensional data in two dimensions simplifies the system for a non-expert. Further, the implementation discussed in this disclosure provides for generating a fast-executing classification scheme.

Computing Environment

FIG. 1A presents a diagram illustrating a computing environment within which a user creates a classification scheme for detecting patterns in a data sequence, in accordance with an embodiment of the present invention. In FIG. 1A, a user 102 desires to detect patterns of motion in a sequence of GPS data from a mobile device 104 owned by a person 106. The mobile device's GPS data may be recorded or transmitted for analysis while the person 106 is walking or operating a vehicle 108. The detected patterns of motion include, for example, motion due to person 106 walking, driving, stopping at a stop light, making a right turn, and colliding with other objects. Although user 102 is not an expert in machine learning, user 102 can utilize an implementation of the invention to generate a classifier 112 using a computer 110. The generated classifier can detect the patterns of motion from the GPS data sequence.

Although examples in this disclosure are illustrated with GPS data, embodiments of the present invention may generate classifiers for analyzing any sequential data sequence. Examples of other data sequences include temporal data streams such as GPS data, audio data, video data, and accelerometer data. Note that the system is agnostic to the particular data type of the data sequence, so long as the data is in a sequence that reflects reality (e.g., temporal data sequences).

The system may generate any type of classifier, including, for example, logistic regression, support vector machine, and/or nearest neighbor classifier. Embodiments of the present invention are not limited to any specific type of classifiers.

Classifier Generating System

Figure 1B:
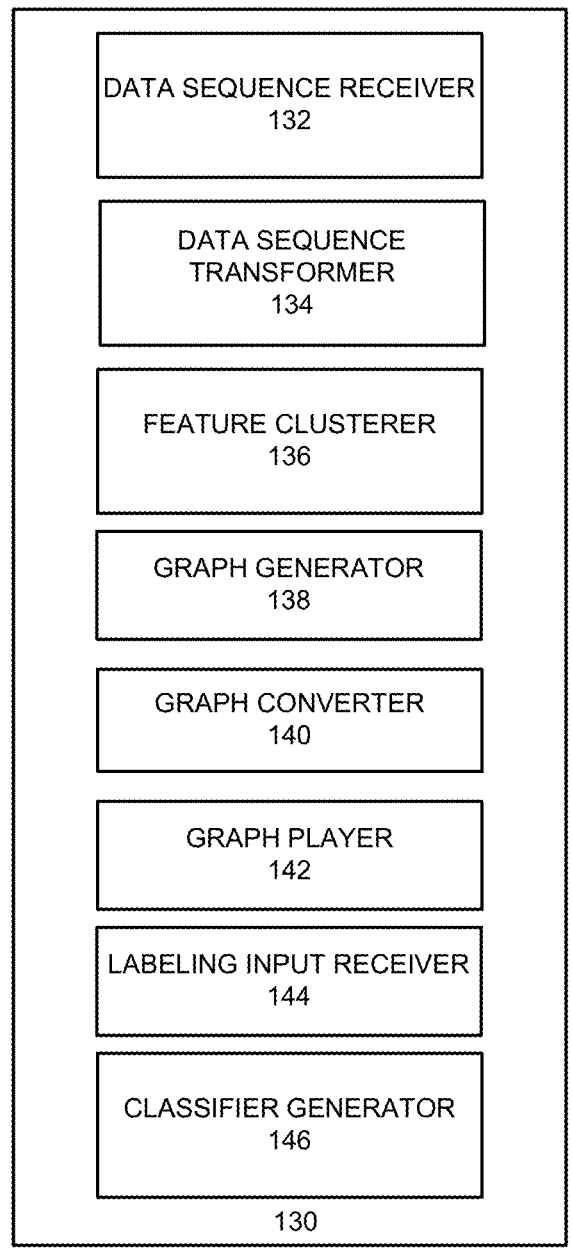
FIG. 1B presents a diagram illustrating a classifier generating system, in accordance with an embodiment of the present invention.

FIG. 1B presents a diagram illustrating a classifier generating system, in accordance with an embodiment of the present invention. In this example, classifier generating system 130 includes a data sequence receiver 132, a data sequence transformer 134, a feature clusterer 136, a graph generator 138, a graph converter 140, a graph player 142, a labeling input receiver 144, and a classifier generator 146.

Data sequence receiver 132 receives the input data sequence. The input data may be GPS data, speech data, vision data, accelerometer data, or any other type of sequential data. Data sequence transformer 134 transforms the input data sequence from the original dimensionality into a higher dimensionality. One technique to transform the input data sequence is sliding a time window across the entire sequence. The time window can include multiple data points (e.g., 11 pairs of longitude and latitude data points). Feature clusterer 136 clusters together features that are within a predetermined threshold distance. Generally, features are characteristics that can be classified, such as data points that can be classified by pattern. The features are the 22-dimensional feature vectors. Graph edges connect a pair of feature vectors that are adjacent in the feature sequence. The system may determine distances between features using, for example, an L2 distance, or any other metric for measuring distances. An L2 distance is also known as the Euclidean distance, e.g., distance between p and q is $d(p,q)=\sqrt{\sum_{i=1}^{n}(q_i-p_i)^2}$, where $p=(p_1, p_2, \ldots, p_n)$ and $q=(q_1, q_2, \ldots, q_n)$ are two points in Euclidean n-space. Graph generator 138 generates a graph with nodes corresponding to the feature vectors.

Graph converter 140 converts the generated graph into two dimensions to facilitate visualization. In one embodiment, graph converter 140 projects the graph to two dimensions using PCA. Other dimensionality reduction techniques are also possible. Graph player 142 plays back the sequence in the two-dimensional form with the corresponding patterns. Labeling input receiver 144 receives user input to label portions of the displayed feature space. Classifier generator 146 generates a classifier based on the user labeling.

Although FIG. 1B illustrates components of classifier generating system 130 with specific functionality, various embodiments of the invention may organize the components differently or divide the functionality among the modules in other ways. Other embodiments may vary the specific functionality assigned to the various components.

Generating A Classification Algorithm

Figure 2:
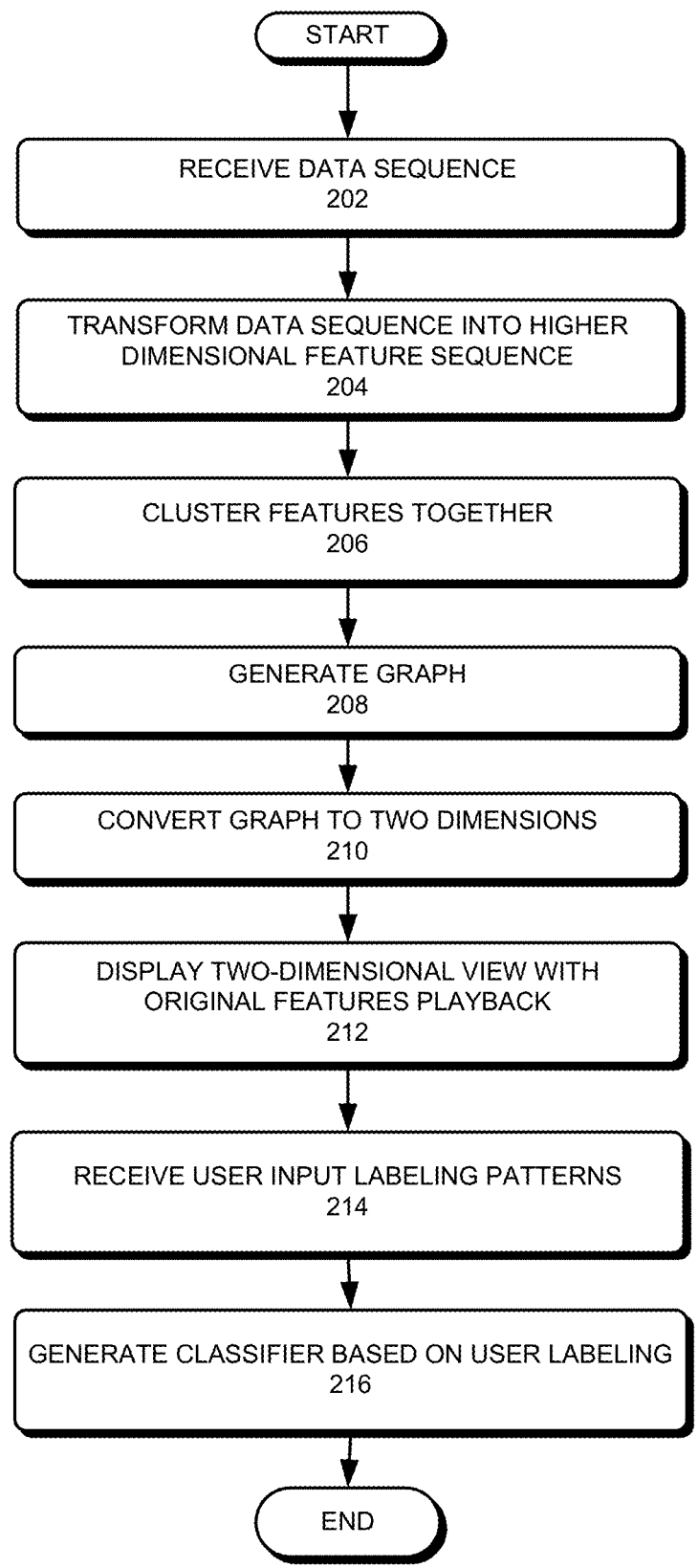
FIG. 2 presents a flow chart illustrating a process for generating a classifier, in accordance with an embodiment of the present invention.

FIG. 2 presents a flow chart illustrating a process for generating a classifier, in accordance with an embodiment of the present invention. During operation, the system initially receives a large corpus of sequential data (operation 202). The input data sequence is typically high-dimensional data (e.g., greater than two or three dimensions). The data sequence can be GPS data, as discussed in the examples presented herein. The GPS data may reflect a person's activities such as walking or driving. The GPS data can include a time-stamped stream of latitude and longitude values.

The system then transforms the input data sequence into a higher-dimensional feature sequence, by sliding a time window across the entire data sequence (operation 204). The time window has a pre-determined time interval (e.g., 10 seconds). The system aggregates the contiguous data points in the time window into a single feature vector. Aggregating the data points in the sliding time window into a single feature vector induces graph sparsity (e.g., reducing the number of edges), which facilitates converting the graph to two dimensions for visualization. With a sparse graph, the converting of the graph to two dimensions can spread the feature points across the two-dimensional plane, making it easier for non-experts to identify two-dimensional regions of patterns.

In one implementation, each feature vector can have 22 dimensions based on 11 data points within a time window, each data point with a latitude and longitude value. GPS data is sampled once per second with a 10 second sliding window. Each feature is the concatenation of 11 GPS data points. By collecting the data at predetermined time intervals to create each feature vector, the system uses the temporal relationship between observation points to improve the visual presentation when converting the graph to two dimensions. The system can also normalize the features (e.g., orienting each feature to be more vertical than horizontal), and normalize the scale of each feature dimension. Further, such preprocessing can also include computing moments of the data, fast Fourier transform, and other signal processing operations.

In some embodiments, using a reasonable metric for the feature space (e.g., L2 distance) and with a predetermined low threshold, the system clusters features together if the distance between the features are less than the predetermined low threshold (operation 206). The low threshold reflects that a feature can be perturbed by noise without significant difference to what the feature represents. Note that other metrics may also be used in the feature space to cluster individual features into feature clusters. The system generates a graph with each node corresponding to a feature vector (operation 208). For the implementation discussed in this disclosure, each node corresponds to a 22-dimensional vector. Edges connect pairs of feature vectors that are adjacent in the feature sequence. Thus, neighboring nodes of the graph are temporally adjacent. Note that these edges correspond to the affinity matrix in dimensionality reduction terminology. An affinity matrix usually records edge weights characterizing similarity relationships between pairs of training samples. As described herein, the affinity matrix defines the closeness of points in the 22-dimensional space, based on the value of edges.

In one embodiment, the affinity matrix can be completely determined by sequential adjacency of features in the data sequence. This enables the system to be agnostic to the specifics of the data types, most notably the similarity metric in the data space, so long as sequential adjacency is a good criterion for measuring affinity. For temporal data sequences, sequential adjacency is a good criterion for measuring affinity. Note that various embodiments may vary in the generation of the affinity matrix from sequential adjacency of features, e.g., binary matrix, weighted by adjacency, etc. Furthermore, implementations of the invention may automatically determine parameters such as time window width, feature scaling, and clustering distance threshold.

Next, the system converts the generated graph into two dimensions (operation 210). In one embodiment, the system projects the graph to two dimensions using PCA. The system performs a physical simulation and treats the edges of the graph as springs and relaxes the graph. During relaxation, the edges contract or expand towards a predetermined natural spring length (e.g., one unit length). In one implementation, edges longer than the predetermined length contract, and edges shorter than the predetermined length expand. The graph relaxation improves the distribution of the points to facilitate analysis and labeling by the user. When the graph reaches a steady state, the user can then label the regions to correspond to patterns. After relaxation, the system can remove the edges from the graphical depiction to allow the user to clearly distinguish the depicted clusters (e.g., cluster 314a-314e or the other depicted clusters in FIG. 3B). Further, the relaxation causes the graph to converge toward temporal adjacency. That is, similar patterns close in time converge together, and patterns that are different or not close in time will spread further apart. Various implementations of the invention may set any spring natural length for relaxing the edges.

Figure 3A:
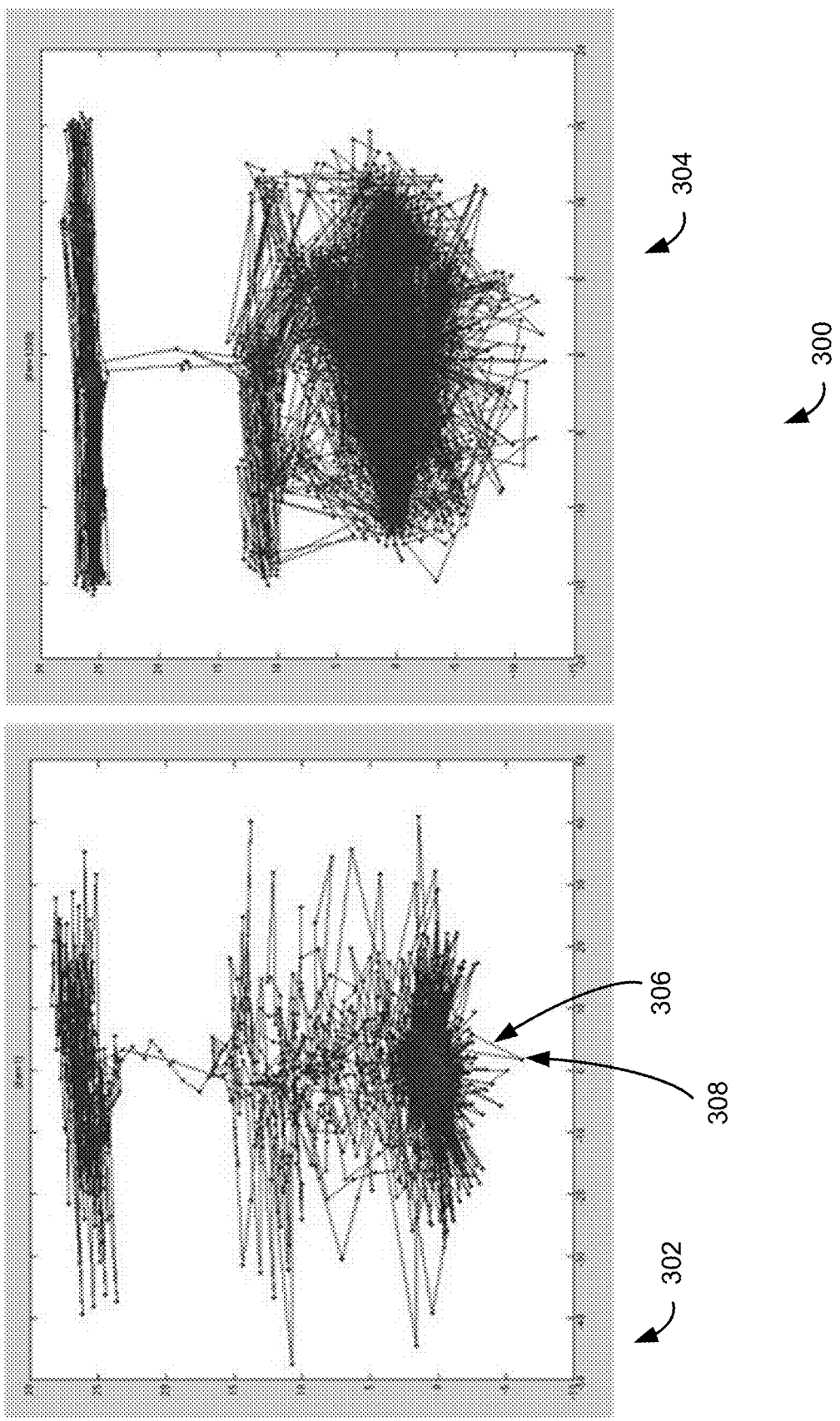
FIG. 3A presents a diagram illustrating graph relaxation after projecting to two dimensions using principal component analysis, in accordance with an embodiment of the present invention.

Some implementations may include a tool to allow a user to pull apart points that become stuck or entangled, thereby allowing the relaxation to continue further. The user may manipulate portions of the graph to assist in the relaxation of the graph. Graph relaxation is illustrated in FIG. 3A, discussed below.

The system displays to the user the two-dimensional view of the feature space, along with the original features' patterns, over a time period (operation 212). By playing back parts of the original sequence in this form, users can identify and label regions of patterns. That is, users can indicate which parts of the feature space correspond to patterns (e.g., walking, left turns, and right turns). Users can draw boundaries around the regions of the feature space that correspond to the patterns (operation 214). The system can store data associating the labeled parts of the feature space with patterns. In one implementation, users may use a graphical user interface (GUI) lasso-like tool to draw the boundaries for labeling patterns. Users can click on a depicted point that represents a node and view a pattern. For example, users may click on nodes 322 illustrated in FIG. 3C and view a pattern 325 for medium speed driving. In some embodiments, users may select a sequence of regions in the two-dimensional conversion to classify longer patterns. After receiving the user input, the system then generates a classifier based on the user labeling (operation 216).

The system may generate any type of classifier. For example, based on the user labeling in the two-dimensional feature space, the system may generate a nearest neighbor classifier for the patterns. The system may also generate logistic regression classifiers, support vector machines, or any other appropriate classifier.

Although this disclosure discusses using PCA for dimensionality reduction, any number of conventional linear methods (e.g., factor analysis) may be implemented. Further, non-linear methods, such as locally linear embedding, auto-encoders, and Gaussian process latent variable models can be used.

Sample Screenshots of Two-Dimensional Graph

FIG. 3A presents a diagram illustrating graph relaxation after projecting to two-dimensions using PCA, in accordance with an embodiment of the present invention. The graph is a two-dimensional view of the converted feature space. FIG. 3A illustrates a PCA projection 302 of the generated graph before relaxation, and a graph 304 after relaxation. A number of edges (e.g. edge 306) connect a number of points (e.g., point 308).

FIGS. 3B, 3C, 3D, and 3E illustrate exemplary two-dimensional conversion of features with corresponding patterns, in accordance with an embodiment of the present invention. FIGS. 3B, 3C, 3D, and 3E illustrate a two-dimensional conversion of features on a left side graph 310. The system displays the corresponding feature patterns on a right side graph 318. In the examples, the feature patterns each represents a 10 second GPS trace.

Figure 3B:
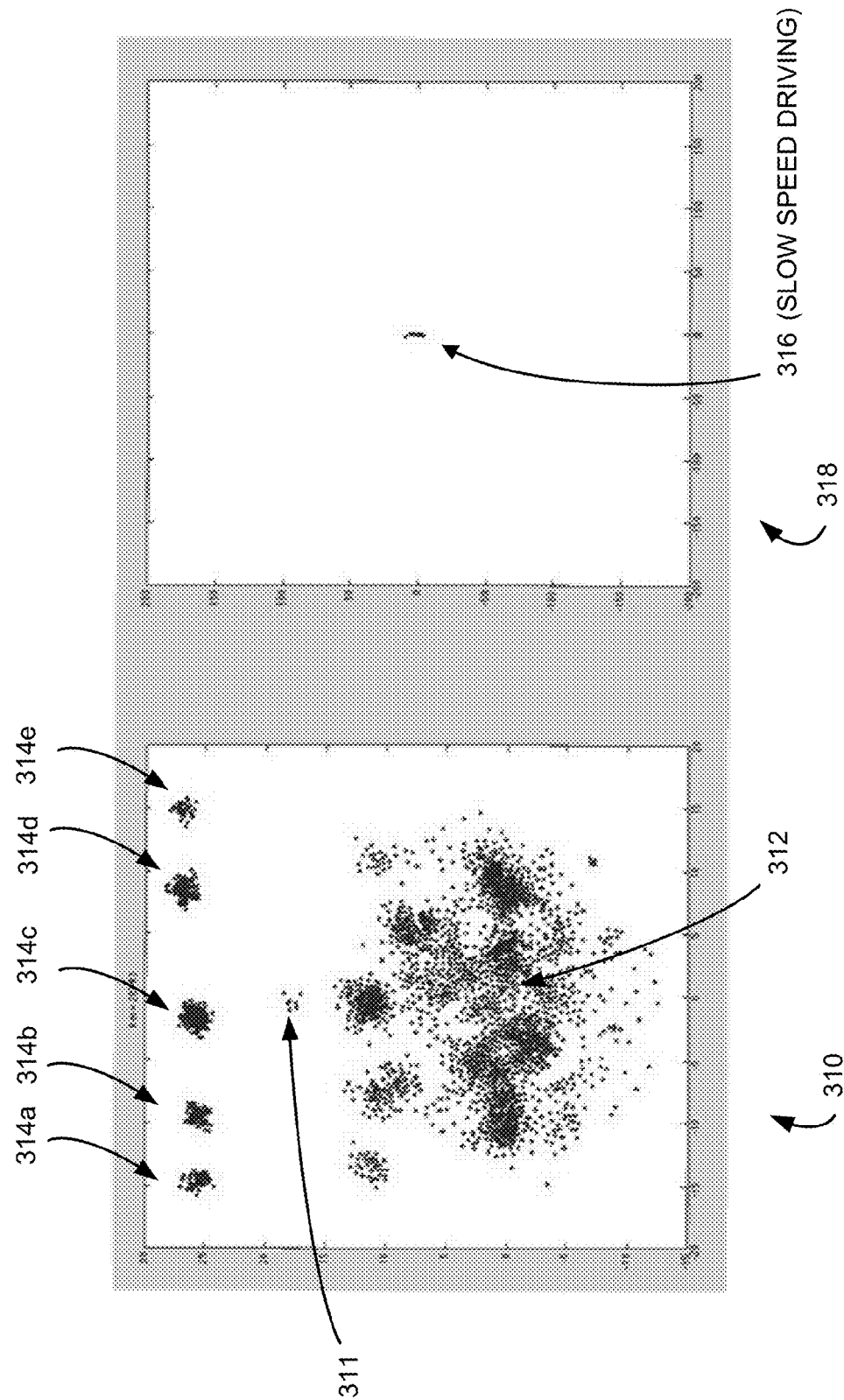
FIGS. 3B, 3C, 3D, and 3E illustrate exemplary two-dimensional conversion of features with corresponding patterns, in accordance with an embodiment of the present invention.
Figure 3C:
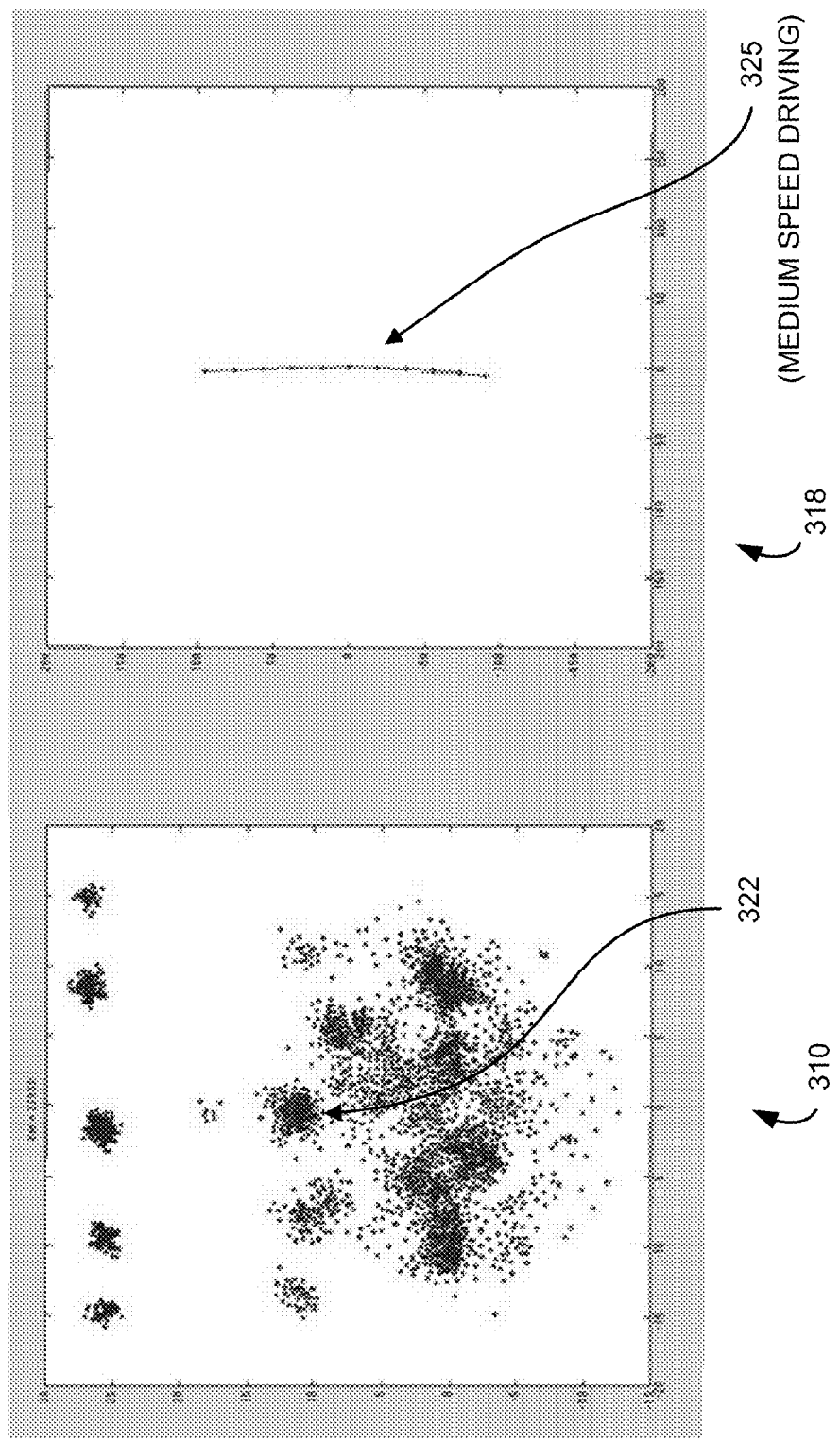
Figure 3D:
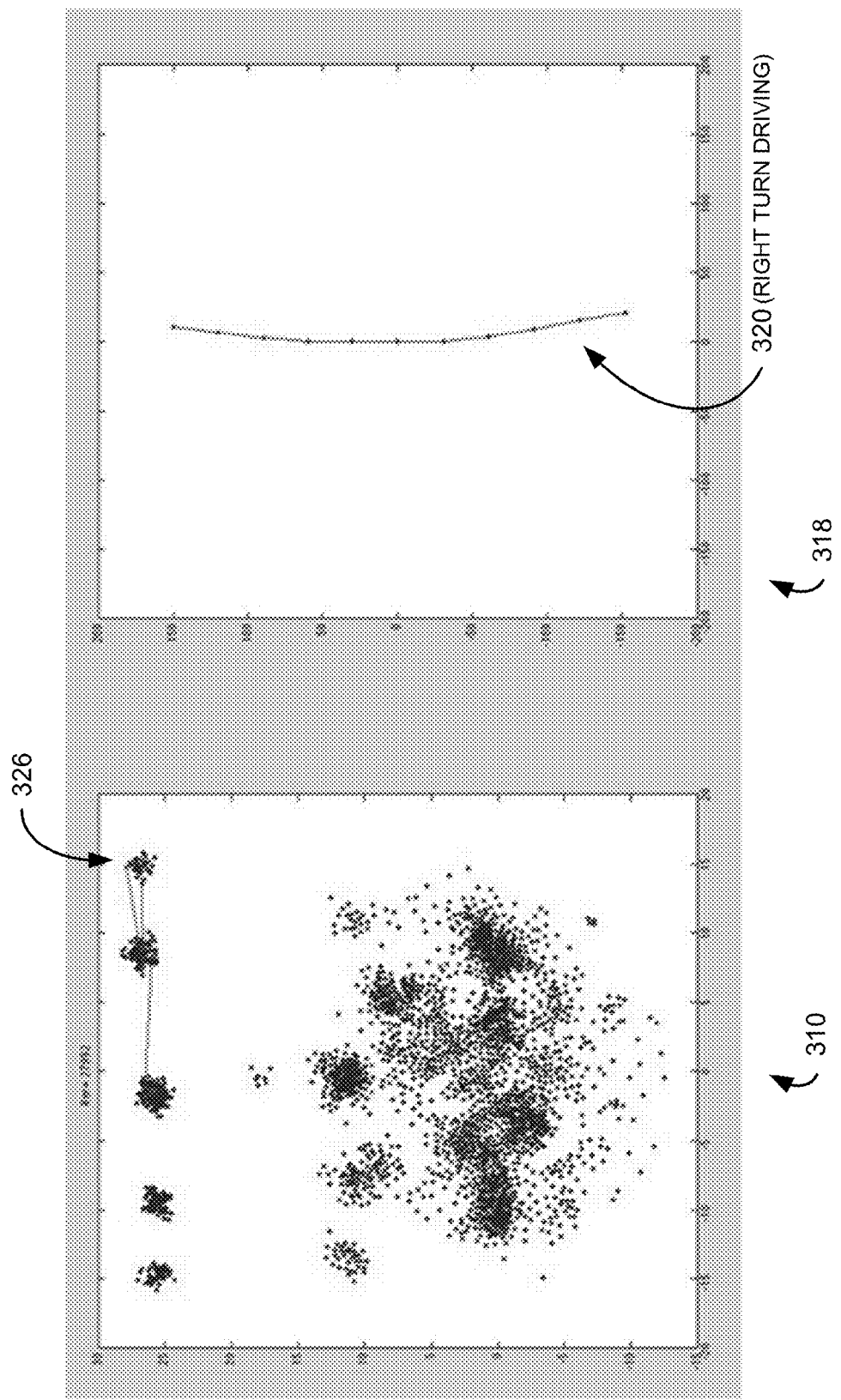

FIGS. 3B, 3C, 3D, and 3E are screenshots from an animation showing changing patterns in graph 318 and the corresponding edges in graph 310. The animation reflects the data sequence from a GPS-equipped mobile device in motion (e.g., a user walking with the GPS-equipped device in hand or riding in a car with the GPS-equipped device). In FIGS. 3B, 3C, 3D, the system displays the graph 302 of FIG. 3A as points without showing all the edges, and the system shows the animation of the edges corresponding to movement patterns of the GPS device.

FIG. 3B shows at least five clusters 314a-314e (other clusters are also depicted in the figure but not referenced). Each of the node clusters 314a-314e contains points that correspond to a pattern. The pattern associated with each point in a cluster can be very similar to another pattern associated with another point in the cluster. Alternatively, the pattern associated with a point in the cluster is very close in time to a similarly shaped pattern.

The spring simulation pulls together patterns that are close in time. Implicitly, it is assumed that patterns that are close in time are very similar. Prominent clusters represent a steady state, such as a car moving fast. For example, cluster 314c contains points associated with patterns for high-speed driving. Transition points 311 positioned between node clusters may correspond to patterns indicating a car picking up speed (e.g., the car may be going onto a highway). A number of points 312 correspond to a slow speed driving pattern 316. A user may provide input to the system indicating that nodes of certain clusters or regions correspond to certain patterns, and the system can use the information to generate classifiers.

FIG. 3C shows a few points 322 within a node cluster, and the points correspond to a medium speed driving pattern 325. In the pattern on the right side graph, the edges between points in the medium speed driving pattern 325 are longer than the edges in the pattern 316 of FIG. 3B since the vehicle is moving faster.

FIG. 3D shows a pattern corresponding to right turn driving on the graph 318. On the left side graph 310, the screenshot captures some edges from the animation. Points in a node cluster 326 correspond to a right turn driving pattern 320. In the pattern on the right side graph 318, the right turn driving pattern slightly curves to the right towards the top.

Figure 3E:
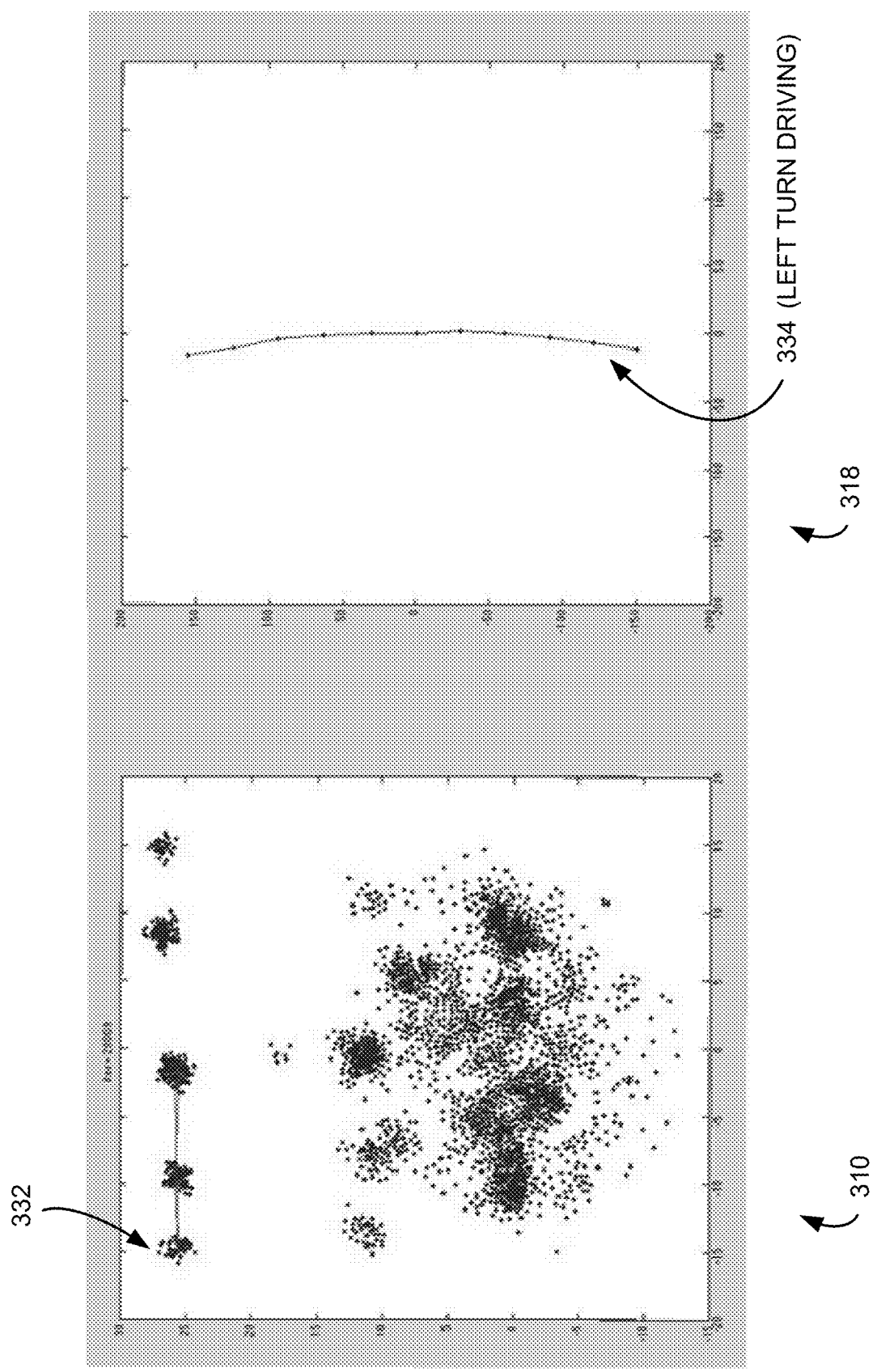

FIG. 3E shows a pattern corresponding to left turn driving in the graph 318. On the left side graph 310, the screenshot captures some edges from the animation. Points in a node cluster 332 correspond to a left turn driving pattern 334. In the pattern on the right side graph 318, the left turn driving pattern 334 slightly curves to the left towards the top.

Exemplary Computer System for Generating A Classifier

Figure 4:
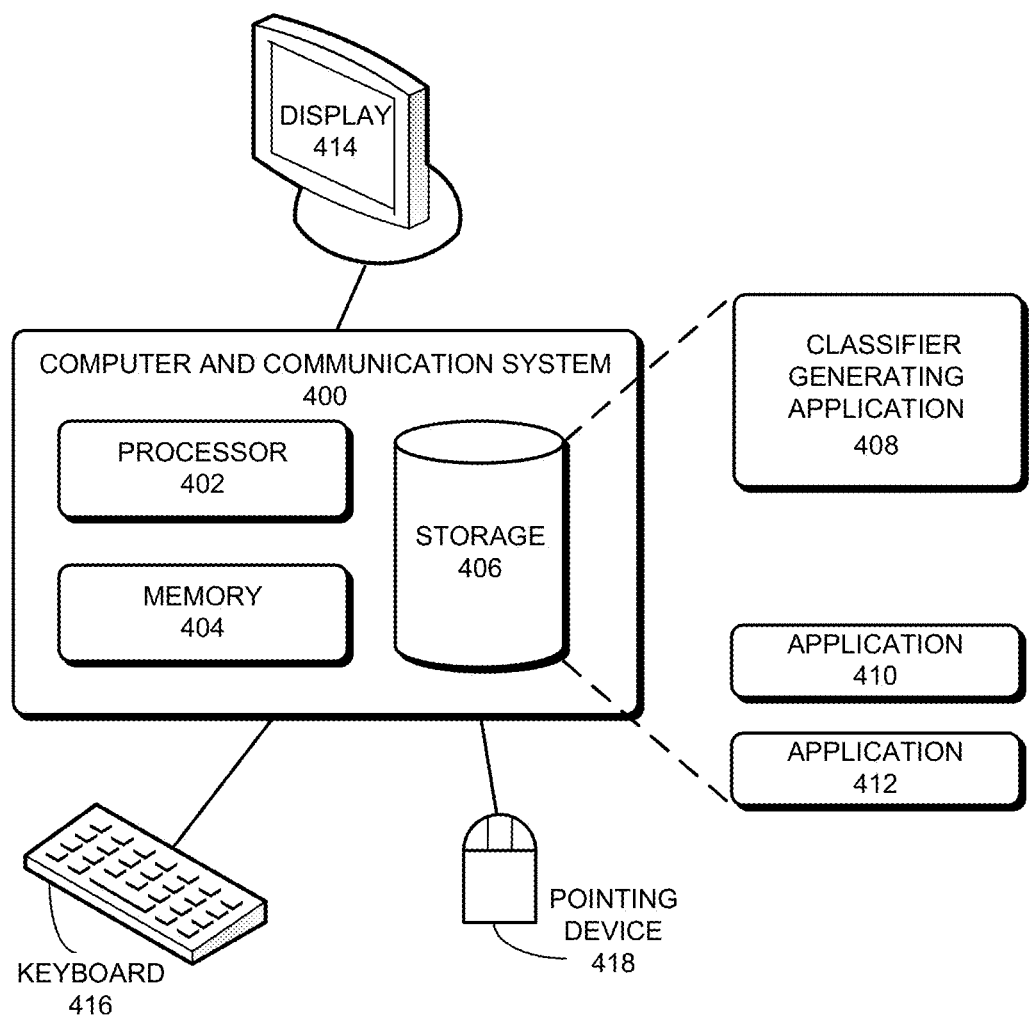
FIG. 4 illustrates an exemplary computer system for generating a classifier, in accordance with one embodiment of the present invention.

FIG. 4 illustrates an exemplary computer system for generating a classifier, in accordance with one embodiment of the present invention. In one embodiment, a computer and communication system 400 includes a processor 402, a memory 404, and a storage device 406. Storage device 406 stores a classifier generating application 408, as well as other applications, such as applications 410 and 412. During operation, classifier generating application 408 is loaded from storage device 406 into memory 404 and then executed by processor 402. While executing the program, processor 402 performs the aforementioned functions. Computer and communication system 400 is coupled to an optional display 414, keyboard 416, and pointing device 418.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for generating a classifier, the method comprising:
    receiving a data sequence that includes location coordinates of a moving object over a period of time;
    grouping contiguous members of the data sequence into an individual feature vector, wherein a respective feature vector corresponds to a respective instance of a sliding time window sliding across the data sequence;
    generating a feature sequence that includes a plurality of feature vectors, wherein a respective feature vector has dimensionality higher than that of the corresponding individual location coordinates of the data sequence;
    generating a graph, wherein a respective node of the graph corresponds to a feature vector, and each edge of the graph connects a pair of feature vectors that are adjacent in the feature sequence;
    converting the generated graph into a two-dimensional graph;
    displaying, to a user, the two-dimensional graph;
    receiving user input indicating that a region including two or more nodes of the two-dimensional graph corresponds to a user-specified pattern of motion; and
    generating a classifier that classifies the two or more nodes as corresponding to the user-specified pattern of motion.

2. The method of claim 1, further comprising:
    determining that a distance between two or more feature vectors is within a threshold distance; and
    clustering the two or more feature vectors together to create a feature cluster.

3. The method of claim 1, further comprising:
    receiving user input to select a point from the two-dimensional graph;
    displaying a graphical depiction of a vector pattern corresponding to the selected point.

4. The method of claim 1, further comprising:
    receiving user input to select a sequence of regions in the two-dimensional graph; and
    associating the sequence of regions with a particular pattern;

wherein generating the classifier further comprises generating the classifier based on the association between the sequence of regions and the particular pattern.

5. The method of claim 1, wherein displaying the two-dimensional graph further comprises:
receiving user input to select a particular point for playback; and
displaying an animation illustrating edges connected to points alongside illustrations of patterns corresponding to the connected points.

6. The method of claim 1, wherein converting the generated graph further comprises relaxing the two-dimensional graph until a steady state is reached by contracting edges greater than a predetermined natural spring length toward the predetermined natural spring length and expanding edges shorter than the predetermined natural spring length toward the predetermined natural spring length.

7. The method of claim 1, further comprising:
providing a graphical user interface tool to the user to allow the user to pull apart points of the two-dimensional graph to facilitate relaxation of the two-dimensional graph.

8. The method of claim 1, further comprising:
receiving user input through a graphical user interface lasso tool for drawing a boundary around a region of the two-dimensional graph to label a pattern.

9. The method of claim 1, further comprising:
removing edges from a graphical depiction of the two-dimensional graph to allow the user to clearly distinguish clusters.

10. The method of claim 1, wherein the user-specified pattern of motion is one of a plurality of motion classifications that include left turn, right turn, and/or stop.

11. A computing system for generating a classifier, the system comprising:
one or more processors,
a non-transitory computer-readable medium coupled to the one or more processors having instructions stored thereon that, when executed by the one or more processors, cause the one or more processors to perform operations comprising:
receiving a data sequence that includes location coordinates of a moving object over a period of time;
grouping contiguous members of the data sequence into an individual feature vector, wherein a respective feature vector corresponds to a respective instance of a sliding time window sliding across the data sequence;
generating a feature sequence that includes a plurality of feature vectors, wherein a respective feature vector has dimensionality higher than that of the corresponding individual location coordinates of the data sequence;
generating a graph, wherein a respective node of the graph corresponds to a feature vector, and each edge of the graph connects a pair of feature vectors that are adjacent in the feature sequence;
converting the generated graph into a two-dimensional graph;
displaying, to a user, the two-dimensional graph;
receiving user input indicating that a region including two or more nodes of the two-dimensional graph corresponds to a user-specified pattern of motion; and
generating a classifier that classifies the two or more nodes as corresponding to the user-specified pattern of motion.

12. The computing system of claim 11, wherein the computer-readable storage medium stores additional instructions that, when executed, cause the one or more processors to perform additional steps comprising:
determining that a distance between two or more feature vectors is within a threshold distance; and
clustering the two or more feature vectors together to create a feature cluster.

13. The computing system of claim 11, wherein the computer-readable storage medium stores additional instructions that, when executed, cause the one or more processors to perform additional steps comprising:
receiving user input to select a point from the two-dimensional graph;
displaying a graphical depiction of a vector pattern corresponding to the selected point.

14. The computing system of claim 11, wherein the computer-readable storage medium stores additional instructions that, when executed, cause the one or more processors to perform additional steps comprising:
receiving user input to select a sequence of regions in the two-dimensional graph; and
associating the sequence of regions with a particular pattern;
wherein generating the classifier further comprises generating the classifier based on the association between the sequence of regions and the particular pattern.

15. The computing system of claim 11, wherein displaying the two-dimensional graph further comprises:
receiving user input to select a particular point for playback; and
displaying an animation illustrating edges connected to points alongside illustrations of patterns corresponding to the connected points.

16. The computing system of claim 11, wherein converting the generated graph further comprises relaxing the two-dimensional graph until a steady state is reached by contracting edges greater than a predetermined natural spring length toward the predetermined natural spring length and expanding edges shorter than the predetermined natural spring length toward the predetermined natural spring length.

17. A non-transitory computer-readable storage medium storing instructions that when executed by a computer cause the computer to perform a method for generating a classifier, the method comprising:
receiving a data sequence that includes location coordinates of a moving object over a period of time;
grouping contiguous members of the data sequence into an individual feature vector, wherein a respective feature vector corresponds to a respective instance of a sliding time window sliding across the data sequence;
generating a feature sequence that includes a plurality of feature vectors, wherein a respective feature vector has dimensionality higher than that of the corresponding individual location coordinates of the data sequence;
generating a graph, wherein a respective node of the graph corresponds to a feature vector, and each edge of the graph connects a pair of feature vectors that are adjacent in the feature sequence;
converting the generated graph into a two-dimensional graph;
displaying, to a user, the two-dimensional graph;
receiving user input indicating that a region including two or more nodes of the two-dimensional graph corresponds to a user-specified pattern of motion; and
generating a classifier that classifies the two or more nodes as corresponding to the user-specified pattern of motion.

18. The non-transitory computer-readable storage medium of claim 17, wherein the computer-readable storage medium stores additional instructions that, when executed, cause the one or more processors to perform additional steps comprising:
  determining that a distance between two or more feature vectors is within a threshold distance; and
  clustering the two or more feature vectors together to create a feature cluster.

19. The non-transitory computer-readable storage medium of claim 17, wherein the computer-readable storage medium stores additional instructions that, when executed, cause the one or more processors to perform additional steps comprising:
  receiving user input to select a point from the two-dimensional graph;
displaying a graphical depiction of a vector pattern corresponding to the selected point.

20. The non-transitory computer-readable storage medium of claim 17, wherein the computer-readable storage medium stores additional instructions that, when executed, cause the one or more processors to perform additional steps comprising:
  receiving user input to select a sequence of regions in the two-dimensional graph; and
  associating the sequence of regions with a particular pattern;
  wherein generating the classifier further comprises generating the classifier based on the association between the sequence of regions and the particular pattern.

21. The non-transitory computer-readable storage medium of claim 17, wherein displaying the two-dimensional graph further comprises:
  receiving user input to select a particular point for playback; and
  displaying an animation illustrating edges connected to points alongside illustrations of patterns corresponding to the connected points.

22. The non-transitory computer-readable storage medium of claim 17, wherein converting the generated graph further comprises relaxing the two-dimensional graph until a steady state is reached by contracting edges greater than a predetermined natural spring length toward the predetermined natural spring length and expanding edges shorter than the predetermined natural spring length toward the predetermined natural spring length.

* * * * *